United States Patent
Glotin et al.

(10) Patent No.: US 11,938,686 B2
(45) Date of Patent: *Mar. 26, 2024

(54) MULTILAYER COMPOSITE COMPOSITION, ITS MANUFACTURING PROCESS, AND ARTICLE OBTAINED THEREOF

(71) Applicants: Arkema France, Colombes (FR); MVC COMPONENTES PLASTICOS LTDA, Sao Jose Dos Pinhais (BR)

(72) Inventors: Michel Glotin, Saint-Cloud (FR); Pierre Gerard, Denguin (FR); Renan Holzmann, Curitiba (FR); Gilmar Da Costa Lima, Curitiba (FR)

(73) Assignee: Arkema France, Colombes (FR)

( * ) Notice: Subject to any disclaimer, the term of this patent is extended or adjusted under 35 U.S.C. 154(b) by 239 days.

This patent is subject to a terminal disclaimer.

(21) Appl. No.: 14/760,547

(22) PCT Filed: Jan. 15, 2014

(86) PCT No.: PCT/EP2014/050711
§ 371 (c)(1),
(2) Date: Jul. 13, 2015

(87) PCT Pub. No.: WO2014/111426
PCT Pub. Date: Jul. 24, 2014

(65) Prior Publication Data
US 2015/0352818 A1  Dec. 10, 2015

(30) Foreign Application Priority Data
Jan. 15, 2013  (WO) ............... PCT/EP2013/050660

(51) Int. Cl.
*B29C 70/08* (2006.01)
*B29B 17/04* (2006.01)
(Continued)

(52) U.S. Cl.
CPC .......... *B29C 70/086* (2013.01); *B29C 66/712* (2013.01); *B29C 66/7212* (2013.01);
(Continued)

(58) Field of Classification Search
CPC .... B32B 2333/12; B29C 66/712; B29C 66/71
See application file for complete search history.

(56) References Cited

U.S. PATENT DOCUMENTS 4,402,780 A * 9/1983 Ogoe ................... B29B 15/10
156/308.2
4,778,717 A * 10/1988 Fitchmun ............. A43B 17/003
442/261
(Continued)

FOREIGN PATENT DOCUMENTS

EP    0693503    1/1996
EP    1632332    3/2006
(Continued)

OTHER PUBLICATIONS

Machine translation of EP 0693503, Jan. 24, 1996.*
(Continued)

*Primary Examiner* — John Vincent Lawler
(74) *Attorney, Agent, or Firm* — Joanne Rossi

(57) ABSTRACT

The present invention relates to a multilayer composition comprising a surface layer comprising a thermoplastic polymer A and a substrate layer comprising a polymeric composite material based thermoplastic (meth)acrylic matrix and a fibrous material as reinforcement. The multilayer composition is suitable for mechanical or structured parts or articles with a decorative surface aspect The present invention concerns also a manufacturing process for multilayer mechanical or structured parts or articles and three-dimensional mechanical or structured parts.

21 Claims, 1 Drawing Sheet

(51) Int. Cl.

| | | |
|---|---|---|
| *B29C 65/00* | (2006.01) | |
| *B29C 70/06* | (2006.01) | |
| *B29C 70/48* | (2006.01) | |
| *B29K 33/00* | (2006.01) | |
| *B29K 55/02* | (2006.01) | |
| *B29K 105/12* | (2006.01) | |
| *B29K 309/08* | (2006.01) | |
| *B29K 633/04* | (2006.01) | |
| *B29K 655/02* | (2006.01) | |
| *B29L 9/00* | (2006.01) | |
| *B32B 27/12* | (2006.01) | |
| *B32B 27/18* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *B32B 37/18* | (2006.01) | |
| *C08J 5/00* | (2006.01) | |
| *B29K 105/06* | (2006.01) | |
| *B32B 38/00* | (2006.01) | |
| *B32B 38/08* | (2006.01) | |

(52) U.S. Cl.
CPC .............. *B29C 70/06* (2013.01); *B29C 70/48* (2013.01); *B32B 27/12* (2013.01); *B32B 27/18* (2013.01); *B32B 27/302* (2013.01); *B32B 27/304* (2013.01); *B32B 27/32* (2013.01); *B32B 27/36* (2013.01); *B32B 27/365* (2013.01); *B32B 27/40* (2013.01); *B32B 37/182* (2013.01); *C08J 5/00* (2013.01); *B29B 17/04* (2013.01); *B29K 2033/08* (2013.01); *B29K 2033/12* (2013.01); *B29K 2055/02* (2013.01); *B29K 2105/06* (2013.01); *B29K 2105/12* (2013.01); *B29K 2309/08* (2013.01); *B29K 2633/12* (2013.01); *B29K 2655/02* (2013.01); *B29K 2995/0018* (2013.01); *B29L 2009/00* (2013.01); *B29L 2009/005* (2013.01); *B32B 2038/0076* (2013.01); *B32B 38/08* (2013.01); *B32B 2260/021* (2013.01); *B32B 2260/046* (2013.01); *B32B 2262/06* (2013.01); *B32B 2262/067* (2013.01); *B32B 2262/08* (2013.01); *B32B 2262/101* (2013.01); *B32B 2262/106* (2013.01); *B32B 2270/00* (2013.01); *B32B 2305/076* (2013.01); *B32B 2305/10* (2013.01); *B32B 2307/538* (2013.01); *B32B 2307/558* (2013.01); *B32B 2307/702* (2013.01); *B32B 2315/085* (2013.01); *B32B 2333/12* (2013.01); *B32B 2355/02* (2013.01); *B32B 2605/00* (2013.01); *C08J 2333/12* (2013.01); *C08J 2355/02* (2013.01); *C08J 2433/12* (2013.01); *C08J 2455/02* (2013.01); *Y02W 30/62* (2015.05); *Y10T 428/31649* (2015.04)

(56) References Cited

U.S. PATENT DOCUMENTS

| | | | | |
|---|---|---|---|---|
| 4,938,823 | A | * | 7/1990 | Balazek ................ B29C 47/003 156/166 |
| 5,171,630 | A | * | 12/1992 | Muzzy ...................... B32B 5/26 428/408 |
| 7,598,321 | B2 | | 10/2009 | Talkowski |
| 7,976,947 | B2 | | 7/2011 | Magnin et al. |
| 2004/0145095 | A1 | * | 7/2004 | McCollum ............ B29C 70/443 264/258 |
| 2004/0161611 | A1 | * | 8/2004 | Mueller .................. B32B 27/18 156/245 |
| 2007/0269645 | A1 | * | 11/2007 | Raghavendran .......... B32B 5/28 428/297.4 |
| 2009/0081448 | A1 | * | 3/2009 | Jambois ................ B29C 47/025 428/327 |
| 2013/0059156 | A1 | | 3/2013 | Da Costa Lima |
| 2014/0004308 | A1 | * | 1/2014 | Taniguchi .................. C08J 5/04 428/156 |

FOREIGN PATENT DOCUMENTS

| | | | | | |
|---|---|---|---|---|---|
| FR | 2640909 | | 6/1990 | | |
| JP | H04-226740 | A | * | 8/1992 | ............ B29C 70/06 |
| JP | H05-176855 | A | * | 7/1993 | ............ A47K 3/02 |
| JP | 2000/006328 | | * | 1/2000 | ............ B32B 27/30 |
| JP | 2001/058329 | A | * | 3/2001 | ............ B29C 39/10 |
| JP | 2001/145579 | A | * | 5/2001 | ............... A47K 3/02 |
| WO | WO 2012/136235 | A1 | * | 10/2012 | ............ B29C 37/00 |
| WO | WO12136235 | | | 10/2012 | |

OTHER PUBLICATIONS

Ma et al., Pultruded fiber Reinforced Thermoplastic Poly(Methyl Methacrylate Composites, Parts I and II, Polymer Engineering and Science, Mid-Aug. 1991, vol. 31, No. 15, pp. 1086-1100. (Year: 1991).*
Yasuda—JP H04-226740 A—Jap. Pat. D8+Kor.D2—MT—fiber-reinforced thermoplastic sheet—1992 (Year: 1992).*
Kanayama—JP H05-176855 A—Jap. Pat. D4—MT—fiber reinforc w-surface layer of polyacetal—1993 (Year: 1993).*
Koyanagi—JP 2000-006328 A—Kor.D1—MT—acrylic monomer+ polymer+filler+curing acc.—2000 (Year: 2000).*
Amekawa—JP 2001-058329 A—Jap. Pat. D9—MT—fiber-reinf molding w-methyl methacrylate + reacted—2001 (Year: 2001).*
Yamamoto—JP 2001-145579 A—Jap.Pat. D6+Kor.D4—MT—bathtub acrylic w-thermoformed layer—2001 (Year: 2001).*
Krueger—WO 2012-136235 A1—ISR D2—MT—fiber+multiple coats of polymer in mold—2012 (Year: 2012).*
Carruthers—What is Resin Transfer Moulding (RTM)_—Coventive Composites—Mar. 1, 2022 (Year: 2022).*
Magnin—Acrylic Resin for Paint & Coatings_ Types, Properties, Application—Mar. 1, 2022 (Year: 2022).*
Krueger—WO 2012-136235 A1—ISR D2—MT b—fiber+multiple coats of polymer in mold—2012 (Year: 2012).*

* cited by examiner

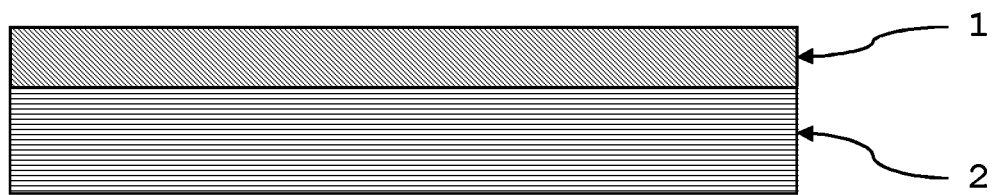
-- Fig. 1 --
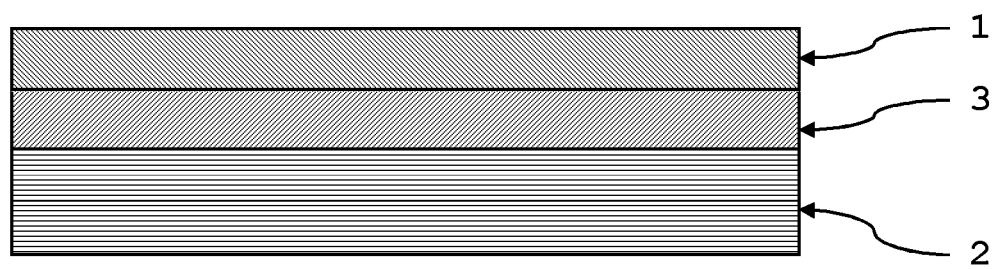
-- Fig. 2 --

MULTILAYER COMPOSITE COMPOSITION, ITS MANUFACTURING PROCESS, AND ARTICLE OBTAINED THEREOF

This application claims benefit, under U.S.C. § 371 of PCT Application Number PCT/EP2014/050711, filed Jan. 15, 2014, which claims the benefit of priority of PCT Application Number PCT/EP2013/050660, filed Jan. 15, 2013.

FIELD OF THE INVENTION

The present invention relates to a multilayer composition comprising a surface layer comprising a thermoplastic polymer A and a substrate layer comprising a polymeric composite material based thermoplastic (meth)acrylic matrix and a fibrous material as reinforcement. The multilayer composition is suitable for mechanical or structured parts or articles with a decorative surface aspect.

The present invention concerns also a manufacturing process for multilayer mechanical or structured parts or articles and three-dimensional mechanical or structured parts.

Technical Problem

Mechanical or structured parts or articles that have to absorb high stresses during their use are widely manufactured from composite materials. A composite material is a macroscopic combination of two ore more non miscible materials. The composite material constitutes at least of a matrix material that forms a continuous phase for the cohesion of the structure and a reinforcing material with various architectures for the mechanical properties. Very often a fibrous material is used as a reinforcing material.

The aim in using composite materials is to achieve a performance from the composite material that is not available from its separate constituents if used alone. Consequently composite materials are widely used in several industrial sectors as for example building, automotive, aerospace, transport, leisure, electronics, and sport notably due to their better mechanical performance (higher tensile strength, higher tensile modulus, higher fracture toughness) in comparison with homogenous materials and their low density.

The most important class in view of volume in commercial industrial scale, are composites with organic matrices, where the matrix material is a generally polymer. The principal matrix or continuous phase of a polymeric composite material is either a thermoplastic polymer or a thermosetting polymer.

A major disadvantage of a thermoset polymer matrix is its rigidity. The matrix cannot be easily shaped in other forms. Once the polymer has been cured the form is fixed. This makes also difficult the recycling of the thermoset composite material and manufactured mechanical or structured parts or articles comprising said thermoset composite material, which are burned in a cement plant or thrown into a waste dump.

For thermoforming and recycling a thermoplastic polymer is preferred.

However the surface of such a structured part or article that is manufactured from a fibre based composite materials is not aesthetic or decorative. The structure of the fibres or the fibrous substrate is visible at the surface. The surface is not plane or the surface of the structured part or article is not homogenous in the meaning of a homogenous surface roughness.

In order to provide a quality finish on the visible surface of a fiber reinforced composite material an additional surface layer is applied. This can either be a gelcoat or a paint layer.

The gel coat is usually based on epoxy or unsaturated polyester chemistry, which is cured for forming crosslinked polymers that are backed with the composite material.

Due to the crosslinking of the surface layer the multilayer composition comprising a thermoplastic composite can not be recycled and thermoformed.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently.

In order to prepare the polymeric composite material the prepolymer is mixed with the other component such as glass beads or fibres or the other component which is wetted or impregnated and cured afterwards. Example for prepolymers or matrix material for thermoset polymers are unsatured polyesters, vinylesters, epoxy or phenolic ones.

The objective of the present invention is to solve the disadvantages mentioned above.

One objective of the present invention is to have a multilayer structural part comprising a thermoplastic composite material with satisfying surface aspect, hiding the fibrous aspect of the layer consisting of thermoplastic composite material.

Another objective of the present invention is to have a multilayer structural part comprising a thermoplastic composite material with adhesion between the respective layers, especially avoiding additional adhesives.

The further objective of the present invention is to have a multilayer structural part comprising a thermoplastic composite material that can be transformed and shaped into form due to a certain flexibility of each layer.

Another objective of the present invention is the recycling of the multilayer structural part including the composite material or multilayer structural parts that do not meet quality standards or worn-out multilayer structural parts. Under recycling is understood to recover at least a part of the used raw materials. This means grinding and reusing the thermoplastic polymer of the respective layers. This means also for example that the monomer from the thermoplastic matrix and of the composite material and/or the other respective layers can be recovered.

Another objective of the present invention is to provide a process which can be carried out at low cost and is capable of large-scale manufacturing, to produce the multilayer structural parts comprising the thermoplastic composite material of the invention. In addition, the process should be easy and simple to carry out using commercially available components. Also the manufacturing of parts should be reproducible and fast meaning short cycle times.

BACKGROUND OF THE INVENTION

Prior Art

The document WO2012/088569 describes a production process for the improvement of the surface quality of composites.

The document WO2012/136235 describes a method for producing a composite fibre multi coat bodywork with class A surface. The surface is obtained by spray application of an in-mould coating system and a releasing agent on the inside of the mold and curing it. The coating is not a thermoplastic and consequently can not be thermoformed or recycled.

The document WO2007/021797 describes a powder coating composition for coating surfaces of thermoplastic composites. The powder coating comprises a vinyl acetate copolymer and a thermoplastic and or thermosetting binder In the prior art no mechanical or structured parts or articles comprising the multilayer composition according to the invention comprising a thermoplastic composite material as substrate layer and a thermoplastic decorative surface layer are described.

BRIEF DESCRIPTION OF THE INVENTION

Surprisingly is has been discovered that a multilayer composition for manufacturing mechanical or structured parts or articles comprising
  a) a surface layer comprising a thermoplastic polymer A
  b) a substrate layer comprising a polymeric composite material
characterized that the polymeric composite material comprises a polymeric thermoplastic (meth)acrylic matrix and a fibrous material as reinforcement wherein the fibrous material comprises either a fiber with an aspect ratio of the fiber of at least 1000 or the fibrous material has a two dimensional macroscopic structure solves the above mentioned technical problems.

It has also been found that a manufacturing process for a multilayer composition for mechanical or structured parts or articles comprising the following steps:
  a) thermoforming the surface layer comprising the thermoplastic polymer A
  b) posing a fibrous substrate on one side of the thermoformed surface layer
  c) impregnating the fibrous substrate with a liquid (meth)acrylic syrup,
  d) polymerising the liquid (meth)acrylic syrup impregnating said fibrous substrate.
yields to a multilayer composition for mechanical or structured parts or articles which solve the above mentioned technical problems.

Additionally it has also been found that a manufacturing process for a multilayer composition for mechanical or structured parts or articles comprising following steps:
  a) impregnating a fibrous substrate with a liquid (meth)acrylic syrup,
  b) polymerising the liquid (meth)acrylic syrup impregnating said fibrous substrate.
  c) laminating the surface layer comprising a thermoplastic polymer A to at least one side of the layer obtained after the polymerization in step b),
yields to a multilayer composition for mechanical or structured parts or articles which solve the above mentioned technical problems.

DETAILED DESCRIPTION OF THE INVENTION

According to a first aspect, the present invention relates to a multilayer composition for manufacturing mechanical or structured parts or articles comprising
  a) a surface layer comprising a thermoplastic polymer A
  b) a substrate layer comprising a polymeric composite material
characterized that the polymeric composite material comprises a polymeric thermoplastic (meth)acrylic matrix and a fibrous material as reinforcement wherein the fibrous material comprises either a fiber with an aspect ratio of the fiber of at least 1000 or the fibrous material has a two dimensional macroscopic structure. This multilayer composition is presented in FIG. 1.

According to another aspect the present invention relates to a multilayer composition for manufacturing mechanical or structured parts or articles comprising
  a) a surface layer comprising a thermoplastic polymer A
  b) a intermediate layer comprising a thermoplastic polymer B
  c) a substrate layer comprising a polymeric composite material
characterized that the polymeric composite material comprises a polymeric thermoplastic (meth)acrylic matrix and a fibrous material as reinforcement wherein the fibrous material comprises either a fiber with an aspect ratio of the fiber of at least 1000 or the fibrous material has a two dimensional macroscopic structure. This multilayer composition is presented in FIG. 2.

By the term "surface layer" as used is denoted that this layer is the top or external layer of the multilayer composition exposed to the environment.

By the term "substrate layer" as used is denoted the layer comprising the thermoplastic polymeric composite material of the multilayer composition.

By the term "intermediate layer" as used is denoted that this layer is between the surface layer and the substrate layer of the multilayer composition. The intermediate layer can be adjacent to any of the two other layers, but does not have to.

By the term "fibrous substrate" as used are denoted fabrics, felts or nonwovens that may be in the form of strips, laps, braids, locks or pieces.

By the term "(meth)acrylic" as used is denoted all kind of acrylic and methacrylic monomers.

By the term "polymeric thermoplastic (meth)acrylic matrix" as used is denoted that the polymeric thermoplastic (meth)acrylic matrix comprises essentially polymers comprising (meth)acrylic monomers that make up 50 wt % or more of the polymeric thermoplastic (meth)acrylic matrix.

By the term "PMMA" as used are denoted homo- and copolymers of methylmethacrylate (MMA), for the copolymer of MMA the weight ratio of MMA inside the PMMA is at least 70 wt %.

By the term "monomer" as used is denoted a molecule which can under go polymerization.

By the term "polymerization" as used is denoted the process of converting a monomer or a mixture of monomers into a polymer.

By the term "thermoplastic polymer" as used is denoted a polymer that turns to a liquid or becomes more liquid or less viscous when heated and that can take on new shapes by the application of heat (thermoforming) and pressure. After cooling down the polymer becomes hard again and keeps the shape formed into.

By the term "polymer composite" as used is denoted a multicomponent material comprising multiple different phase domains in which at least one type of phase domain is a continuous phase and in which at least one component is a polymer.

With regard to structure part or article made of the multilayer composition this concerns a panel, a cover or a hull made of composite material or parts for aircrafts, for boats (hull and deck), rail cars (hatch, partition, body), and automotive parts (car body, hood, door.)

The thermoplastic polymer A of the surface layer can be chosen from the following list of polymers:
- (Meth)acrylic polymers
- saturated polyester (PET, PBT, PLA etc.);
- ABS (acrylonitrile-butadiene-styrene copolymer);
- SAN (styrene-acrylonitrile copolymer);
- ASA (acrylic-styrene-acrylonitrile copolymer);
- polystyrene (crystalline or high-impact);
- polypropylene (PP);
- polyethylene (PE);
- polycarbonate (PC);
- PPO;
- polysulfone;
- PVC (polyvinylchloride);
- PVDF (polyvinylidene fluoride)
- chlorinated PVC (PVCC);
- PU (polyurethane).

The surface layer can also comprise blends of two or more polymers from the above list of the thermoplastic polymer A. For example, it can be a blend of (meth)acrylic polymers with PVDF.

The thermoplastic polymer A of the surface layer can contain fillers or additives. As additives one can mention organic additives as impact modifiers or block copolymers, thermal stabilizers, UV stabilizers, flame retardants and mixtures thereof.

Preferably the thermoplastic polymer A of the surface layer is chosen from (meth)acrylic polymer, ASA (acrylic-styrene-acrylonitrile copolymer), PVDF (polyvinylidene fluoride), polycarbonate (PC) or mixtures thereof.

More preferably thermoplastic polymer A of the surface layer is a (meth)acrylic polymer and even more preferably a PMMA.

The thermoplastic polymer A of the surface layer can be in form of a film, foil or a sheet.

The thermoplastic polymer B of the intermediate layer can be chosen from the following list of polymers:
- (Meth)acrylic polymers
- saturated polyester (PET, PBT, PLA etc.);
- ABS (acrylonitrile-butadiene-styrene copolymer);
- SAN (styrene-acrylonitrile copolymer);
- ASA (acrylic-styrene-acrylonitrile copolymer);
- polystyrene (crystalline or high-impact);
- polypropylene (PP);
- polyethylene (PE);
- polycarbonate (PC);
- PPO;
- polysulfone;
- PVC (polyvinylchloride);
- PVDF (polyvinylidene fluoride)
- chlorinated PVC (PVCC);
- PU (polyurethane).

The intermediate layer can also comprise blends of two or more polymers B from the above list of thermoplastic polymer B.

For example, it can be PET/PC blend, PMMA/PLA or ABS/PC blend.

The thermoplastic polymer B of the intermediate layer can contain fillers or additives. As additives one can mention organic additives as impact modifiers or block copolymers, thermal stabilizers, UV stabilizers, flame retardants and mixtures thereof.

Preferably the thermoplastic polymer B is chosen from (meth)acrylic polymer, ABS (acrylonitrile-butadiene-styrene copolymer) ASA (acrylic-styrene-acrylonitrile copolymer), PVDF (polyvinylidene fluoride), polycarbonate (PC) or mixtures thereof.

Advantageously the thermoplastic polymer B is ABS or ASA.

The thermoplastic polymer B of the intermediate layer can be in form of a film, foil or a sheet.

The thermoplastic (meth)acrylic matrix of the a polymeric composite material of substrate layer comprises at least one (meth)acrylic polymer comprising one or more (meth)acrylic
monomers. The (meth)acrylic monomer or monomers make up at least 50 wt % or more, preferably 60 wt % or more, more preferably 70 wt % or more, advantageously 80 wt % or more of the polymeric thermoplastic (meth)acrylic matrix.

Preferably (meth)acrylic polymer or polymers makes up at least 80% by weight advantageously at least 90% by weight of thermoplastic (meth)acrylic matrix.

In a preferred embodiment the thermoplastic (meth)acrylic matrix consists of (meth)acrylic polymer or polymers.

With regard to the (metha)acrylic polymer, one could mention poly alkyl methacrylates or poly alkyl acrylates. In a preferred embodiment the (meth)acrylic polymer is poly methyl methacrylate (PMMA).

The term "PMMA" denotes a methyl methacrylate (MMA) homopolymer or a copolymer or mixtures thereof.

In one embodiment the homo- or copolymer of methyl methacrylate (MMA) comprises at least 70%, preferably at least 80%, advantageously at least 90% and more advantageously at least 95% by weight of methyl methacrylate.

In another embodiment the PMMA is a mixture of at least one homopolymer and at least one copolymer of MMA, or a mixture of at least two homopolymers or two copolymers of MMA with a different average molecular weight or a mixture of at least two copolymers of MMA with a different monomer composition.

The copolymer of methyl methacrylate (MMA) comprises from 70% to 99.7% by weight of methyl methacrylate and from 0.3 to 30% by weight of at least one monomer having at least one ethylenic unsaturation that can copolymerize with methyl methacrylate.

These monomers are well known and mention may be made, in particular of acrylic and methacrylic acids and alkyl-(meth)acrylates in which the alkyl group has from 1 to 12 carbon atoms. As examples, mention may be made of methyl acrylate and ethyl, butyl or 2-ethylhexyl (meth)acrylate. Preferably the comonomer is an alkyl acrylate in which the alkyl group has from 1 to 4 carbon atoms.

In a preferred embodiment the copolymer of methyl methacrylate (MMA) comprises from 80% to 99.7% advantageously from 90% to 99.7% and more advantageously from 90% to 99.5% by weight of methyl methacrylate and from 0.3% to 20% advantageously from 0.3% to 10% and more advantageously from 0.5% to 10% by weight of at least one monomer having at least one ethylenic unsaturation that can copolymerize with methyl methacrylate. Preferably the comonomer is chosen from methyl acrylate or ethyl acrylate or mixtures thereof.

The weight average molecular weight of the (meth)acrylic polymer should be high, meaning larger than 50 000 g/mol, preferably larger than 100 000 g/mol.

The weight average molecular weight can be measured by size exclusion chromatography (SEC).

With regard to the (meth)acrylic monomer, the monomer is chosen from acrylic acid, methacrylic acid, alkyl acrylic monomers, alkyl methacrylic monomers and mixtures thereof.

Preferably the monomer is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the meth)acrylic monomer is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

More advantageously the monomer is chosen (meth) acrylic monomer is chosen from methyl methacrylate, isobornyl acrylate or acrylic acid and mixtures thereof.

In a preferred embodiment at least 50 wt %, preferably at least 60 wt % of the monomer is methyl methacrylate.

In a more preferred embodiment at least 50 wt %, preferably at least 60 wt %, more preferably at least 70 wt % and advantageously at least 80 wt % and even more advantageously 90 wt % of the monomer is a mixture of methyl methacrylate with isobornyl acrylate and/or acrylic acid.

With regard to the fibrous material of the polymeric composite material of the substrate layer one can mention fabrics, felts or nonwovens that may be in the form of strips, laps, braids, locks or pieces. The fibrous material can have different forms and dimensions either one dimensional, two dimensional or three dimensional. A fibrous substrate comprises an assembly of one or more fibres. When the fibres are continuous, their assembly forms fabrics.

The one dimensional form is linear long fibres. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and more advantageously at least 5000, even more advantageously at least 6000 most advantageously at least 7500 and at most advantageously at least 10 000.

The two dimensional form are fibrous mats or non-woven reinforcements or woven roving or bundles of fibers, which can also be braded. Even if these two dimensional forms have a certain thickness and therefore in principle a third dimension, they are considered as two dimensional according to the present invention.

The three dimensional form are for example stacked or folded fibrous mats or non woven reinforcements or bundles of fibers or mixtures thereof, an assembly of the two dimensional form in the third dimension.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, sugar cane and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylacohol, polyolefins, polyurethanes, polyvinylchloride, polyethylene, unsaturated polyesters, epoxy resins and vinylesters.

The mineral fibers can also be chosen from glass fibers especially of type E, R or S2, carbon fibers, boron fibers or silica fibers.

The fibrous substrate of the present invention is chosen from vegetable fibers, wood fibers, animal fibers, mineral fibers, synthetic polymeric fibers, glass fibers, carbon fibers or mixtures thereof.

Preferably the fibrous substrate is chosen from mineral fibers.

The fibres of the fibrous material have a diameter between 0.005 µm and 100 µm, preferably between 1 µm and 50 µm, more preferably between 5 µm and 30 µm and advantageously between 10 µm and 25 µm.

Preferably the fibres of the fibrous material of the present invention are chosen from continuous fibres (meaning that the aspect ratio does not apply as for long fibres) for the one dimensional form, or long or continuous fibres forming the two or three dimensional form of the fibrous substrate.

Still another aspect of the present invention is a manufacturing process for a multilayer composition for mechanical or structured parts or articles comprising the following steps:
  a) thermoforming the surface layer comprising the thermoplastic polymer A
  b) posing a fibrous substrate on one side of the thermoformed surface layer
  c) impregnating the fibrous substrate with a liquid (meth) acrylic syrup,
  d) polymerising the liquid (meth)acrylic syrup impregnating said fibrous substrate.

Preferably the steps a) to d) are performed in that order.

In a variation the thermoformed the surface layer comprising the thermoplastic polymer A is put in a mold before posing the fibrous substrate in step c).

More preferable the surface layer comprising the thermoplastic polymer A in step a) is substituted by a multilayer structure comprising the surface layer comprising the thermoplastic polymer A and the intermediate layer comprising the thermoplastic polymer B. In that case the fibrous substrate in step b) is posed on the intermediate layer.

Preferably the impregnation of the fibrous substrate in step c) is made in a closed mold.

More advantageously step c) and step d) are made in the same closed mould.

The surface layer comprising the thermoplastic polymer A or the multilayer structure comprising the surface layer comprising the thermoplastic polymer A and the intermediate layer comprising the thermoplastic polymer B, both to be thermoformed, are in form of a film or a sheet.

The said film of sheet has a thickness of less than 10 mm, preferably less than 6 mm.

Still another aspect of the present invention is a manufacturing process for a multilayer composition for mechanical or structured parts or articles comprising following steps:
  a) impregnating a fibrous substrate with a liquid (meth) acrylic syrup,
  b) polymerising the liquid (meth)acrylic syrup impregnating said fibrous substrate.
  c) laminating the surface layer comprising a thermoplastic polymer A to at least one side of the layer obtained after the polymerization in step b).

Preferably the impregnation of the fibrous substrate in step a) is made in a closed mold.

Advantageously the step a) and step b) are made in the same closed mould.

The mold may have already the final shape of the mechanical or structured part or article.

If the mold is flat, the mechanical or structured part or article can be thermoformed before step c) and an already thermoformed surface layer is laminated to it.

If the mold is flat the surface layer can be laminated and the mechanical or structured part or article can be thermoformed after step c).

More preferable the surface layer comprising the thermoplastic polymer A in step c) is substituted by a multilayer structure comprising the surface layer comprising the thermoplastic polymer A and the intermediate layer comprising the thermoplastic polymer B.

The surface layer comprising the thermoplastic polymer A or the multilayer structure comprising the surface layer comprising the thermoplastic polymer A and the intermediate layer comprising the thermoplastic polymer B, both to be laminated, are in form of a film or a sheet.

The said film of sheet has a thickness of less then 10*mm*, preferably less then 6*mm*.

The mold is opaque towards visible and ultraviolet radiation at least on one side A closed mold will amongst other things avoid and reduce the evaporation of the monomer and protect the environment.

Using the same closed mold will avoid the transfer of the material after impregnation and polymerizing in a closed mold will guarantee a good distribution of the heat, having a satisfying yield of polymerization and eventually evaporation of the monomer(s).

The manufacturing process for a multilayer composition for mechanical or structured parts or articles comprises a step of impregnating the fibrous substrate with a liquid (meth)acrylic syrup.

A simple (meth)acrylic monomer or a (meth)acrylic monomer mixture as liquid (meth)acrylic syrup is too liquid for the impregnation process of the present invention, especially for the correct and complete wetting and impregnation of the fibrous substrate. Therefore the viscosity has to be adapted by increasing it.

With regard to the liquid (meth)acrylic syrup according to the invention that impregnates the fibrous substrate, it comprises a (meth)acrylic monomer or a mixture of a (meth) acrylic monomers, a (meth)acrylic polymer and at least one initiator or initiating system for starting the polymerization of the (meth)acrylic monomer.

According to the invention the viscosity is increased by using (meth)acrylic monomer or a mixture of a (meth) acrylic monomers with dissolved (meth)acrylic polymer or (meth)acrylic polymers. This solution is commonly referred to as "syrup" or "prepolymer".

Advantageously the liquid (meth)acrylic syrup contains no additionally voluntary added solvent.

Advantageously the liquid (meth)acrylic syrup contains no additionally voluntary added styrene monomer.

The (meth)acrylic polymer is completely soluble in the (meth)acrylic monomer.

This (meth)acrylic polymer is PMMA, meaning the homo- or copolymer of methyl methacrylate (MMA) or a mixture thereof as defined before.

This (meth)acrylic monomer is the same as defined before.

The (meth)acrylic monomer or the (meth)acrylic monomers in the liquid (meth)acrylic syrup present at least 40% by weight, preferably 50% by weight, advantageously 60% by weight and more advantageously 65% by weight of total liquid (meth)acrylic syrup in view of (meth)acrylic monomer and (meth)acrylic polymer.

The (meth)acrylic monomer or the (meth)acrylic monomers in the liquid (meth)acrylic syrup present at most 90% by weight, preferably at most 85% by weight, advantageously at most 82% by weight and more advantageously at most 80% by weight of total liquid syrup in view of (meth)acrylic monomer and (meth)acrylic polymer.

The (meth)acrylic polymer or polymers in the liquid (meth)acrylic syrup present at least 10% by weight, preferable at least 15%, advantageously at least 18% and more advantageously at least 20% by weight of total liquid (meth)acrylic syrup in view of (meth)acrylic monomer and (meth)acrylic polymer.

The (meth)acrylic polymer or polymers in the liquid (meth)acrylic syrup present at most 60% by weight, preferable at most 50%, advantageously at most 40% and more advantageously at most 35% by weight of total liquid (meth)acrylic syrup.

The (meth)acrylic monomer or the (meth)acrylic monomers in the liquid (meth)acrylic syrup presents from 40% to 90% by weight, preferably from 50% to 90% by weight, advantageously from 55% to 85% by weight and more advantageously from 60% to 80% by weight of total liquid syrup in view of (meth)acrylic monomer and (meth)acrylic polymer.

Accordingly (meth)acrylic polymer or polymers in the liquid (meth)acrylic syrup presents from 60% to 10% by weight, preferably from 50% to 10% by weight, advantageously from 15% to 45% by weight and more advantageously from 20% to 40% by weight of total liquid syrup in view of (meth)acrylic monomer and (meth)acrylic polymer.

The dynamic viscosity of the liquid (meth)acrylic syrup is in a range from 10 mPa*s to 10000 mPa*s, preferably from 50 mPa*s to 5000 mPa*s and advantageously from 100 mPa*s to 1000 mPa*s. The viscosity of the syrup can be easily measured with a Rheometer or viscosimeter. The dynamic viscosity is measured at 25° C. The liquid (meth) acrylic syrup has a Newtonian behaviour, meaning no shear thinning, so that the dynamic viscosity is independent of the shearing in a rheometer or the speed of the mobile in a viscosimeter.

If the viscosity of the liquid (meth)acrylic syrup at a given temperature is too high for the impregnation process and for the correct impregnation, it is possible to heat the syrup in order to have a more liquid syrup within the before mentioned dynamic viscosity interval at the respective temperature during which the impregnation takes place for the sufficient wetting and correct and complete impregnation of the fibrous substrate.

The liquid syrup according to the present invention does not contain any additional solvent voluntary added.

With regard to the initiator or initiating system for starting the polymerization of the (meth)acrylic monomer, one could mention initiators or initiating systems that are activated by heat.

The heat activated initiator is preferably a radical initiator.

With regard to the radical initiator, they can be chosen from diacyl peroxides, peroxy esters, dialkyl peroxides, peroxyacetals or azo compounds.

The initiator or initiating system for starting the polymerization of the (meth)acrylic monomer is chosen from isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, tert-butyl peroctoate, azobisisobutyronitrile (AIBN), azobisisobutyramide, 2,2'-azobis(2,4-dimethylvaleronitrile) or 4,4'-azobis(4-cyanopentanoic). It would not be departing from the scope of the invention to use a mixture of radical initiators chosen from the above list.

Preferably the initiator or initiating system for starting the polymerization of the (meth)acrylic monomer is chosen from peroxides having 2 to 20 carbon atoms The content of radical initiator with respect to the (meth)acrylic monomer of the a liquid (meth)acrylic syrup is from 100 to 50000 ppm by weight (50000 ppm=5 wt %), preferably between 200 and 40000 ppm by weight and advantageously between 300 and 30000 ppm.

The (meth)acrylic monomer is typically one or more monomers as defined above with, optionally, a suitable inhibitor such as hydroquinone (HQ), methyl hydroquinone (MEHQ), 2,6-di-tertiary-butyl-4-methoxyphenol (Topanol O) and 2,4-dimethyl-6-tertiary-butyl phenol (Topanol A).

The inhibitor is present to prevent the monomer from spontaneously polymerising.

The liquid (meth)acrylic syrup comprises optionally also an activator for the polymerization.

Polymerisation activator or accelerator is chosen from tertiary amines such as N,N-dimethyl-p-toluidine (DMPT), N,N-dihydroxyethyl-p-toluidine (DHEPT), organic-soluble transition metal catalysts or mixtures thereof.

The content of the activator with respect to the to the (meth)acrylic monomer of the liquid (meth)acrylic syrup is from 100 ppm to 10000 ppm (by weight), preferably from 200 ppm to 7000 ppm by weight and advantageously from 300 ppm to 4000 ppm.

The presence of activators or accelerators depends upon the final application. Where "cold-cure" is necessary or wished, an accelerator is usually necessary. Cold cure means that the polymerization takes place at ambient temperature, meaning less than 50° C. or preferably less than 40° C.

However, for industrial applications the use of heat in "heat-cure" systems is also possible.

Another ingredient in the liquid resin can also be a chain-limiting agent in order to control the molecular weight, for example γ-terpinene or terpinolene, at contents of between 0 and 500 ppm and preferably between 0 and 100 ppm, with respect to the monomers of the mixture.

The liquid (meth)acrylic syrup may comprise also other additives and fillers. A filler in the scope of the present invention is not considered as an additive.

All the additives and fillers can be added to the liquid (meth)acrylic syrup before the impregnation.

As additives one can mention organic additives as impact modifiers or block copolymers, thermal stabilizers, UV stabilizers, lubricants and mixtures thereof.

The impact modifier is in the form of fine particles having an elastomeric core and at least one thermoplastic shell, the size of the particles being in general less than 1 μm and advantageously between 50 and 300 nm. The impact modifier is prepared by emulsion polymerization. The impact modifier content in the liquid (meth)acrylic syrup is from 0 to 50 wt %, preferably from 0 to 25 wt %, and advantageously from 0 to 20% by weight.

As fillers one can mention carbon nanotubes or mineral charges including mineral nano charges (TiO2, silica).

The filler content in the liquid (meth)acrylic syrup is from 0 to 20 wt %.

The step of impregnating the fibrous substrate with a liquid (meth)acrylic syrup in the manufacturing process for a multilayer composition is made in one embodiment with a syrup comprising
a) from 10 wt % to 59.99 wt % (meth)acrylic polymer,
b) from 40 wt % to 89.99 wt % (meth)acrylic monomer,
c) from 0.01 wt % to 5 wt % one initiator or initiating system for starting the polymerization of the (meth)acrylic monomer,
d) from 0 wt % to 1 wt % activator,
e) from 0 wt % to 20 wt % filler,
f) from 0 wt to 20 wt % additives.

With regards to the substrate layer, it comprises a polymeric composite material, said polymeric composite material comprises a polymeric thermoplastic (meth)acrylic matrix and a fibrous material.

The fibrous material according to the invention presents at most 60% by volume of the composite material.

Preferably the fibrous material presents between 10% and 60% by volume of the composite material.

Preferably the thermoplastic (meth)acrylic matrix presents between 90% and 40% by volume of the composite material.

With regard to manufacturing process for manufacturing the multilayer composition for the mechanical or structured parts or articles comprising the substrate layer comprising the polymeric composite material, several methods could be used in order to prepare the three-dimensional mechanical or structured parts. One can mention infusion, vacuum bag moulding, pressure bag molding, autoclave molding, resin transfer moulding (RTM), reaction injection molding (RIM) reinforced reaction injection molding (R-RIM) and variants thereof, press molding or compression molding.

The preferred manufacturing process for manufacturing the multilayer composition for mechanical or structured parts or articles comprising the substrate layer comprising the polymeric composite material are processes where the liquid (meth)acrylic syrup is transferred to the fibrous substrate by impregnating the fibrous substrate in a mold more preferably in a closed mold.

Advantageously the impregnation step of the fibrous substrate is made in a closed mold.

Most advantageously the manufacturing process for manufacturing the multilayer composition for mechanical or structured parts or articles comprising the substrate layer comprising the polymeric composite material is chosen from resin transfer molding or infusion.

All manufacturing processes comprise the step of impregnating the fibrous substrate with the liquid (meth)acrylic syrup before the polymerization step in a mold.

The step of polymerising of the liquid (meth)acrylic syrup impregnating said fibrous substrate takes place after the impregnation step in the same mold.

Resin transfer molding is a method using a two sided mold set which forms both surfaces of composite material. The lower side is a rigid mould. The upper side can be a rigid or flexible mould. Flexible moulds can be made from composite materials, silicone or extruded polymer films such as nylon. The two sides fit together to produce a mould cavity. The distinguishing feature of resin transfer moulding is that the fibrous substrate is placed into this cavity and the mould set is closed prior to the introduction of the liquid (meth)acrylic syrup.

According to one embodiment to the invention a thermoformed film, foil or a sheet comprising the thermoplastic polymer A of the surface layer could be put on one side inside the mold, before the fibrous substrate is placed into this cavity and the mould.

According to another embodiment the invention a thermoformed multilayer film, foil or a sheet comprising the thermoplastic polymer A of the surface layer and the intermediate layer comprising the thermoplastic polymer B could be put on one side inside the mold, before the fibrous substrate is placed into this cavity and the mould.

Resin transfer moulding includes numerous varieties which differ in the mechanics of how the liquid (meth) acrylic syrup is introduced to the fibrous substrate in the mould cavity. These variations include everything from vacuum infusion to vacuum assisted resin transfer moulding (VARTM). This process can be performed at either ambient or elevated temperature. Ambient temperature means between 10° C. and 50° C. Elevated temperature means up to 200° C. Preferably elevated temperature is from 50° C. up to 160° C.

With the infusion method the liquid (meth)acrylic syrup does have to have the adapted viscosity towards this preparation method of the polymeric composite material. The liquid (meth)acrylic syrup is aspired into the fibrous substrate present in a special mold by application of a slight vacuum. The fibrous substrate is infused and completely impregnated by the liquid (meth)acrylic syrup.

One advantage of this method is the high amount of fibrous material in the composite.

With regard to the use of manufactured mechanical or structured parts or articles or three-dimensional mechanical or structured part comprising the multilayer composition, one can mention automotive applications, nautical applications, railroad applications, sport, aeronautic and aerospace applications, photovoltaic applications, computer related applications, telecommunication applications and wind energy applications.

Particularly the three-dimensional mechanical or structured part is an automobile part (truck, caravan, bus, motorcycle), boat part, train part, sport article, plane or helicopter part, space ship or rocket part, photovoltaic module part, wind turbine part, furniture part, construction or building part, telephone or cell phone part, computer or television part, printer and photocopy machine part.

With regard to the recycling of the structured part, comprising the multilayer composition it can be made by grinding or depolymerization of the thermoplastic polymer.

Grinding is made mechanically in order to obtain smaller parts of pieces. As the structured part compromises thermoplastic polymers, this polymer can be heated, and the pieces again transformed in a certain limit in order to obtain a new object. The ground powders can be mixed with other thermoplastic products to obtain a formulation that can be more easily processed using classical tools such as extruders or injection molding machines.

Preferably the structured part comprising the thermoplastic composite is heated for making a pyrolysis or thermal decomposition of the PMMA and recovering the methyl methacrylate as monomer.

Advantageously at least 50 wt % of the MMA present in the polymer are recovered by thermal decomposition.

The structured part is heated at a temperature of at least 200° C. and no more than 400° C.

FIGURES

FIG. 1

Multilayer composition according to one aspect of the invention with a surface layer (1) comprising a thermoplastic polymer A and the substrate layer (2) comprising a polymeric composite material.

FIG. 2

Multilayer composition according to another aspect of the invention with a surface layer (1) comprising a thermoplastic polymer A and the substrate layer (2) comprising a polymeric composite material characterized and an additional intermediate layer (3) between the surface layer (1) and the substrate layer (2), said intermediate later comprises a thermoplastic polymer B.

EXAMPLES

A multilayer composition is realized according to the structure given in FIG. 2. The surface layer (1) and the intermediate layer (3) are obtained by thermoforming Senosan AM50 from the company SENOPLAST in a mold. The carrier layer of Senosan AM50 consists of an easily thermo-formable and high impact ABS and will give the intermediate layer and the top layer is an impact modified acrylic (PMMA) and will give the surface layer. The substrate layer comprising the polymeric composite material is obtained by polymerizing a methacrylic syrup in the same closed mold after infusion of a fibrous material.

The syrup is prepared by dissolving 25 parts by weight of the PMMA (BS520 a copolymer of MMA comprising ethyl acrylate as a comonomer) in 75 parts by weight of methyl methacrylate, which is stabilized with MEHQ (hydroquinone monomethyl ether). To the 100 parts by weight of the syrup are added 2 parts by weight of benzoyl peroxide (BPO—Luperox A75 from ARKEMA) and 0.2 parts by weight of DMPT (N,N-dimethyl-p-toluidine from Sigma-Aldrich). The syrup has a dynamic viscosity of 520 mPa*s at 25° C.

The syrup is infused in a closed mould comprising a sheet of Senosan AM50 with the toplayer toward one mold surface and a glass fabric as fibrous substrate posed on the intermediate ABS layer; the syrup will impregnate the fibrous material. Then the syrup is polymerized at 25° C. during 80 minutes in the mold.

A multilayer composition according to FIG. 2 is obtained

The invention claimed is:

1. A multilayer composition for manufacturing mechanical or structured parts or articles comprising
   a) a surface layer comprising a thermoplastic polymer A, and
   b) a substrate layer comprising a polymeric composite material wherein said polymeric composite material comprises a polymeric thermoplastic (meth)acrylic matrix selected from the group consisting of a homopolymer or copolymer of methyl(meth)acrylate comprising at least 70% by weight of methyl(meth)acrylate and mixtures thereof, and a fibrous material as reinforcement, wherein the fibrous material comprises discontinuance fibers and wherein said polymeric composite material is formed by the impregnation of said fibrous material with a (meth)acrylic syrup comprising a methyl methacrylate polymer having a weight average molecular weight of greater than 100,000 g/mol, dissolved in a (meth)acrylic monomer wherein said (meth)acrylic monomer comprises methyl methacrylate monomer, followed by polymerization of said (meth)acrylic syrup, wherein said (meth)acrylic syrup has a dynamic viscosity at 25° C. between 10 mPa*s and 10000 mPa*s, and wherein said (meth)acrylic syrup comprises the (meth)acrylic monomer or a mixture of the (meth)acrylic monomers, the methyl methacrylate polymer and at least one initiator or initiating system for starting the polymerization of the (meth)acrylic monomer, wherein said (meth)acrylic syrup forms the polymeric thermoplastic (meth)acrylic matrix, wherein said impregnation of said fibrous material is made in a closed mold, and wherein said surface layer has a thickness of less than 10 mm.

2. The multilayer composition according to claim 1 wherein said multilayer composition further comprises an intermediate layer between the surface layer and the substrate layer, said intermediate layer comprises a thermoplastic polymer B.

3. The multilayer composition according to claim 1 wherein said thermoplastic polymer A is selected from the group consisting of:
(meth)acrylic polymers;
saturated polyester;
polyethylene terephthalate, polybutylene terephthalate, polylactic acid; ABS (acrylonitrile-butadiene-styrene copolymer);
SAN (styrene-acrylonitrile copolymer);
ASA (acrylic-styrene-acrylonitrile copolymer);
Polystyrene, crystalline polystyrene, high impact polystyrene;
polypropylene (PP);
polyethylene (PE);
polycarbonate (PC);
PPO;
polysulfone;
PVC (polyvinylchloride);
PVDF (polyvinylidene fluoride)
chlorinated PVC (PVCC);
PU (polyurethane)
and mixtures thereof.

4. The multilayer composition according to claim 2 wherein said thermoplastic polymer B is selected from the group consisting of
(meth)acrylic polymers
saturated polyester, polyethylene terephthalate, polybutylene terephthalate, polylactic acid;
ABS (acrylonitrile-butadiene-styrene copolymer);
SAN (styrene-acrylonitrile copolymer);
ASA (acrylic-styrene-acrylonitrile copolymer);
Polystyrene, crystalline polystyrene, high impact polystyrene;
polypropylene (PP);
polyethylene (PE);
polycarbonate (PC);
PPO;
polysulfone;
PVC (polyvinylchloride);
PVDF (polyvinylidene fluoride)
chlorinated PVC (PVCC);
PU (polyurethane)
and mixtures thereof.

5. The multilayer composition according to claim 1, wherein said thermoplastic polymer A is selected from the group consisting of:
(meth)acrylic polymers;
ASA (acrylic-styrene-acrylonitrile copolymer);
polycarbonate (PC);
PVDF (polyvinylidene fluoride)
and mixtures thereof.

6. The multilayer composition according to claim 1 wherein said thermoplastic polymer A is selected from (meth)acrylic polymers.

7. The multilayer composition according to claim 2 wherein said thermoplastic polymer B is selected from the group consisting of:
(meth)acrylic polymers;
ABS (acrylonitrile-butadiene-styrene copolymer);
ASA (acrylic-styrene-acrylonitrile copolymer);
polycarbonate (PC);
PVDF (polyvinylidene fluoride)
and mixtures thereof.

8. The multilayer composition according to claim 2, wherein said thermoplastic polymer B is an acrylonitrile-butadiene-styrene copolymer.

9. The multilayer composition according to claim 1 wherein said thermoplastic (meth)acrylic matrix is a methyl methacrylate (MMA) homopolymer or a copolymer comprising at least 70%, by weight of methyl methacrylate.

10. The multilayer composition according to claim 1 wherein said fibrous material is selected from the group consisting of vegetable fibers, wood fibers, animal fibers, mineral fibers, synthetic polymeric fibers, glass fibers, carbon fibers and mixtures thereof.

11. A manufacturing process for a multilayer composition for mechanical or structured parts or articles according to claim 1 comprising one of the following sets of steps A or B:
A a) thermoforming the surface layer comprising the thermoplastic polymer A,
  b) positioning a fibrous substrate on one side of the thermoformed surface layer,
  c) impregnating the fibrous substrate with a liquid (meth)acrylic syrup, and
  d) polymerising the liquid (meth)acrylic syrup impregnating said fibrous substrate,
B a) impregnating a fibrous substrate with a liquid (meth)acrylic syrup,
  b) polymerising the liquid (meth)acrylic syrup impregnating said fibrous substrate, and
  c) laminating the surface layer comprising a thermoplastic polymer A to at least one side of the layer obtained after the polymerization in step Bb).

12. The manufacturing process according to claim 11, wherein said impregnation of the fibrous substrate is made in a closed mold.

13. The manufacturing process according to claim 11, wherein said liquid (meth)acrylic syrup has a dynamic viscosity at 25° C. between 10 mPa*s and 10000 mPa*s.

14. The manufacturing process according to claim 11, wherein said liquid (meth)acrylic syrup comprises a (meth)acrylic monomer or a mixture of a (meth)acrylic monomers, a (meth)acrylic polymer and at least one initiator or initiating system for starting the polymerization of the (meth)acrylic monomer.

15. The manufacturing process according to claim 14, wherein said (meth)acrylic monomer or the (meth)acrylic monomers in the liquid (meth)acrylic syrup present at least 40% by weight.

16. The manufacturing process according to claim 14, wherein said (meth)acrylic polymer or polymers in the liquid (meth)acrylic syrup present at least 10% by weight of total liquid (meth)acrylic syrup.

17. The manufacturing process according to claim 14, wherein said (meth)acrylic polymer or polymers in the liquid (meth)acrylic syrup present at most 60% by weight of total liquid (meth)acrylic syrup.

18. The manufacturing process according to claim 11, wherein said liquid (meth)acrylic syrup comprises
  a) from 10 wt % to 59.99 wt % (meth)acrylic polymer,
  b) from 40 wt % to 89.99 wt % (meth)acrylic monomer,
  c) from 0.01 wt % to 5 wt % one initiator or initiating system for starting the polymerization of the (meth) acrylic monomer,
  d) from 0 wt % to 1 wt % activator,
  e) from 0 wt % to 20 wt % filler, and
  f) from 0 wt to 20 wt % additives.

19. The manufacturing process according to claim 11, wherein said process comprises resin transfer molding or infusion.

20. Three-dimensional mechanical or structured part obtained by the manufacturing process according to claim 11.

21. Part according to claim 20, wherein said part is a automobile part, boat part, train part, sport article, plane or helicopter part, space ship or rocket part, photovoltaic module part, wind turbine part, furniture part, construction or building part, telephone or cell phone part, computer or television part, or printer and photocopy machine part.

\* \* \* \* \*